(12) United States Patent
Li et al.

(10) Patent No.: US 12,205,373 B2
(45) Date of Patent: Jan. 21, 2025

(54) METHOD AND APPARATUS FOR DETECTING OPEN FLAME, AND STORAGE MEDIUM

(71) Applicant: HANGZHOU HIKMICRO SENSING TECHNOLOGY CO., LTD., Hangzhou (CN)

(72) Inventors: Feng Li, Hangzhou (CN); Wei Yang, Hangzhou (CN); Hengyu Jiang, Hangzhou (CN); Jiajie Li, Hangzhou (CN)

(73) Assignee: HANGZHOU HIKMICRO SENSING TECHNOLOGY CO., LTD., Hangzhou (CN)

( * ) Notice: Subject to any disclaimer, the term of this patent is extended or adjusted under 35 U.S.C. 154(b) by 438 days.

(21) Appl. No.: 17/425,255

(22) PCT Filed: Dec. 26, 2019

(86) PCT No.: PCT/CN2019/128864
§ 371 (c)(1),
(2) Date: Jul. 22, 2021

(87) PCT Pub. No.: WO2020/151453
PCT Pub. Date: Jul. 30, 2020

(65) Prior Publication Data
US 2022/0092868 A1    Mar. 24, 2022

(30) Foreign Application Priority Data

Jan. 22, 2019    (CN) .................... 201910059674.1

(51) Int. Cl.
*G06K 9/00*    (2022.01)
*G06T 7/70*    (2017.01)
(Continued)

(52) U.S. Cl.
CPC ............... *G06V 20/52* (2022.01); *G06T 7/70* (2017.01); *G06V 10/25* (2022.01); *G06V 10/255* (2022.01);
(Continued)

(58) Field of Classification Search
CPC ........ G06V 10/22; G06V 10/23; G06V 10/25; G06V 10/255; G06V 10/26; G06V 10/28;
(Continued)

(56) References Cited

U.S. PATENT DOCUMENTS 6,184,792 B1 *  2/2001  Privalov ............ G08B 17/125
                                                    382/100
6,696,958 B2 *  2/2004  Anderson .......... G08B 17/125
                                                    348/164

(Continued)

FOREIGN PATENT DOCUMENTS

CN    102881106 A    1/2013
CN    104853151 A    8/2015
(Continued)

OTHER PUBLICATIONS

Ignacio Bosch, Soledad Gomez, Raquel Molina, and Ramón Miralles, "Object Discrimination by Infrared Image Processing", Springer, Lecture Notes in Computer Science, vol. 5602, 2009, pp. 30-40 (Year: 2009).*

(Continued)

*Primary Examiner* — Eric Rush
(74) *Attorney, Agent, or Firm* — Knobbe Martens Olson & Bear LLP

(57) ABSTRACT

A method for detecting an open flame includes: acquiring a plurality of frames of first images of a suspected target in a monitoring region; acquiring gray scale change features of the plurality of frames of first images and attribute features of the suspected target based on the plurality of frames of
(Continued)

| Acquiring a plurality of frames of first images of a suspected target in a monitoring region | —21 |

| Acquiring gray scale change features of the plurality of frames of first images and attribute features of the suspected target based on the plurality of frames of first images, the gray scale change features being configured to indicate temperature changes of the suspected target | —22 |

| Determining the suspected target in the monitoring region as an open flame, if the gray scale change features of the plurality of frames of first images and the attribute features of the suspected target both satisfy an open flame condition | —23 | first images, the gray scale change features being configured to indicate temperature changes of the suspected target; and determining the suspected target in the monitoring region as an open flame, if the gray scale change features of the plurality of frames of first images and the attribute features of the suspected target both satisfy an open flame condition.

14 Claims, 4 Drawing Sheets

(51) Int. Cl.
*G06V 10/20* (2022.01)
*G06V 10/25* (2022.01)
*G06V 10/62* (2022.01)
*G06V 10/70* (2022.01)
*G06V 10/764* (2022.01)
*G06V 20/40* (2022.01)
*G06V 20/50* (2022.01)
*G06V 20/52* (2022.01)
*G08B 17/00* (2006.01)
*G08B 17/12* (2006.01)

(52) U.S. Cl.
CPC ............ *G06V 10/62* (2022.01); *G06V 10/764* (2022.01); *G06V 10/768* (2022.01); *G06V 20/44* (2022.01); *G06V 20/50* (2022.01); *G08B 17/005* (2013.01); *G08B 17/125* (2013.01)

(58) Field of Classification Search
CPC .... G06V 10/40; G06V 10/422; G06V 10/431; G06V 10/507; G06V 10/52; G06V 10/56; G06V 10/58; G06V 10/62; G06V 10/70; G06V 10/764; G06V 10/768; G06V 10/77; G06V 10/7715; G06V 20/40; G06V 20/41; G06V 20/44; G06V 20/48; G06V 20/50; G06V 20/52; G06T 7/0002; G06T 7/60; G06T 7/62; G06T 7/70; G06T 2207/10016; G06T 2207/10048; G06T 2207/30232; G08B 17/00; G08B 17/005; G08B 17/10; G08B 17/103; G08B 17/107; G08B 17/117; G08B 17/12; G08B 17/125
USPC ....... 382/100, 103, 106, 154, 162, 164, 165, 382/168–173, 181, 190, 191, 203, 209, 382/218, 224, 225, 282, 291, 325; 348/61, 82, 83, 135, 143, 161, 162, 164, 348/169, 226.1; 250/336.1, 338.1, 250/339.14, 339.15, 340, 341.1, 342; 340/577, 578
See application file for complete search history.

(56) References Cited

U.S. PATENT DOCUMENTS

| 9,250,135 | B2* | 2/2016 | Cole ..................... G01J 5/0018 |
| 9,747,501 | B2* | 8/2017 | Seo ......................... G06V 20/52 |
| 2002/0021221 | A1* | 2/2002 | Okamoto ............. G08B 17/125 340/577 |
| 2008/0136934 | A1 | 6/2008 | Zhao et al. |
| 2008/0191886 | A1* | 8/2008 | Chao ................... G08B 17/125 382/100 |
| 2012/0195462 | A1 | 8/2012 | Pu et al. |
| 2017/0169683 | A1* | 6/2017 | Ryder .................... G08B 17/12 |
| 2020/0012859 | A1 | 1/2020 | Zheng et al. |
| 2022/0072350 | A1* | 3/2022 | Bausch .................. G08B 21/10 |

FOREIGN PATENT DOCUMENTS

| CN | 105046868 A | 11/2015 |
| CN | 106096603 A | 11/2016 |
| CN | 106997461 A | 8/2017 |
| CN | 108108695 A | 6/2018 |
| EP | 0818766 A1 | 1/1998 |
| JP | 2016110263 A | 6/2016 |

OTHER PUBLICATIONS

China National Intellectual Property Administration, First office action of Chinese application No. 201910059674.1 issued on Mar. 14, 2023.
International search report of PCT application No. PCT/CN2019/128864 issued on Mar. 26, 2020.
Extended European search report of European application No. 19911262.4 issued on Feb. 16, 2022.
Steven Verstockt et al., Future Directions for Video Fire Detection, Fire Safety science—Proceedings of the 10th International Symposium, pp. 529-542, Jan. 1, 2011.
Steven Verstockt et al., Multi-sensor Fire Detection by Fusing Visual and Non-visual Flame Features, Jun. 30, 2010, Advances in Biometrics: International Conference, ICB 2007, Seoul, Korea, Aug. 27-29, 2007; Proceedings; [Lecture Notes in Computer Science; Lect . Notes Computer], Springer, Berlin, Heidelberg, pp. 333-341.
Toreyin Behcet Ugur, Fire detection in infrared video using wavelet analysis, Optical Enginering, vol. 46, No. 6, Jun. 1, 2007, pp. 067204-1-067204-9.

* cited by examiner

METHOD AND APPARATUS FOR DETECTING OPEN FLAME, AND STORAGE MEDIUM

CROSS-REFERENCE TO RELATED APPLICATION

This application is a US national phase application of international application No. PCT/CN2019/128864, filed on Dec. 26, 2019, which claims priority to the Chinese Patent Application No. 201910059674.1, filed on Jan. 22, 2019 and titled "METHOD AND APPARATUS FOR DETECTING OPEN FLAME, AND STORAGE MEDIUM", the disclosure of each of which is herein incorporated by reference in its entirety.

TECHNICAL FIELD

The present disclosure relates to the field of safety protection, in particular to a method and apparatus for detecting an open flame, and a storage medium.

BACKGROUND

Public places, factories, etc. all have non-smoking areas. Smoking in non-smoking areas not only affects the human health, but also poses safety risks. Therefore, it is necessary to detect an open flame caused by smoking in the non-smoking areas.

SUMMARY

According to an aspect, an embodiment of the present disclosure provides a method for detecting an open flame. The method includes:
  acquiring a plurality of frames of first images of a suspected target in a monitoring region;
  acquiring gray scale change features of the plurality of frames of first images and attribute features of the suspected target based on the plurality of frames of first images, the gray scale change features being configured to indicate temperature changes of the suspected target; and
  determining the suspected target in the monitoring region as an open flame if the gray scale change features of the plurality of frames of first images and the attribute features of the suspected target both satisfy an open flame condition.

According to another aspect, an embodiment of the present disclosure provides an apparatus for detecting an open flame. The apparatus includes:
  a first acquiring module, configured to acquire a plurality of frames of first images of a suspected target in a monitoring region;
  a second acquiring module, configured to acquire gray scale change features of the plurality of frames of first images and attribute features of the suspected target based on the plurality of frames of first images, the gray scale change features being configured to indicate temperature changes of the suspected target; and
  a first determining module, configured to determine the suspected target in the monitoring region as an open flame, if the gray scale change features of the plurality of frames of first images and the attribute features of the suspected target both satisfy an open flame condition.

According to another aspect, an embodiment of the present disclosure provides an apparatus for detecting an open flame, including a processor and a memory, wherein the memory stores at least one instruction therein, the instruction being loaded and performed by the processor to implement any of the methods for detecting the open flame as mentioned above.

According to another aspect, an embodiment of the present disclosure provides a computer-readable storage medium storing at least one instruction therein, the instruction being loaded and performed by the processor to implement any of the methods for detecting the open flame as mentioned above.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Unless otherwise defined, all terms used in embodiments of the present disclosure have the same meaning as commonly understood by a person of ordinary skill in the art. In order to make the objectives, technical solutions and advantages of the present disclosure clearer, a further detailed description will be made to the embodiments of the present disclosure below with reference to the accompanying drawings.

The related art provides a method for detecting an open flame. The method includes: acquiring images of a suspected target in a monitoring region; acquiring some features, such as, an area of the suspected target, a shape of the suspected target and whether the suspected target is dynamic based on the images of the suspected target; and determining that the suspected target in the monitoring region is an open flame if these features meet an open flame condition.

When the features (an area, a shape, and whether being dynamic) all meet the open flame condition, the suspected target is not necessarily an open flame, which makes the detection accuracy of this method low.

Open flames caused by smoking in non-smoking areas not only affect the human health, but may also cause explosions and other accidents and pose safety hazards. Therefore, warning signs such as "No smoking", "No open flames" and "Open flames prohibited" are provided in the no-smoking areas. However, some people ignore these warning signs and engage in smoking and other behaviors to cause open flames, which affects the human health and safety. Therefore, it is necessary to detect open flames in the no-smoking areas. In this case, embodiments of the present disclosure provide a method and apparatus for detecting an open flame, and a storage medium.

Figure 1:
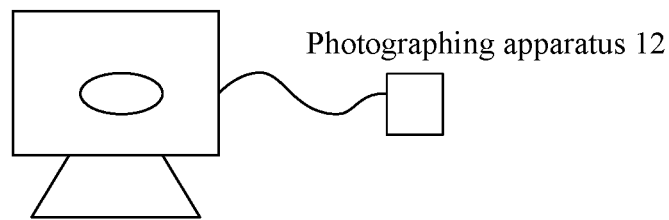
FIG. 1 is a schematic diagram of an implementing environment according to an embodiment of the present disclosure.

FIG. 1 is a schematic diagram of an implementing environment according to an example embodiment. The implementing environment includes at least one terminal 11 and a photographing apparatus 12. The photographing apparatus 12 may be directly fixed on the terminal 11; or the photographing apparatus 12 may also be provided separately and not fixed to the terminal 11. As shown in FIG. 1, a description is made by taking the photographing apparatus 12 being connected to the terminal 11 electrically or wirelessly as an example. The terminal 11 acquires a plurality of frames of images of a monitoring region through the photographing apparatus 12.

The terminal 11 may be any electronic product that may perform a man-machine interaction with a user through one or more means such as a keyboard, a touch panel, a touch screen, a remote controller, voice interaction, or a handwriting device. For example, the terminal 11 may be a personal computer (PC), a mobile phone, a smart phone, a personal digital assistant (PDA), a wearable device, a pocket PC (PPC), a tablet computer, a smart vehicle-mounted machine, a smart TV, or a smart speaker.

The photographing apparatus 12 is a device with a function of acquiring images or videos, which may be, for example, an infrared camera or an infrared vidicon.

A person skilled in the art should understand that the aforementioned terminal 11 and photographing apparatus 12 are only examples. Other terminals or servers that may appear at present or in the future are applicable to the present disclosure, and should also be included in the protection scope of the present disclosure, which are incorporated herein by reference in their entireties.

Based on the implementing environment, a method for detecting an open flame according to an embodiment of the present disclosure will be described in detail below in conjunction with the accompanying drawings.

Figure 2:
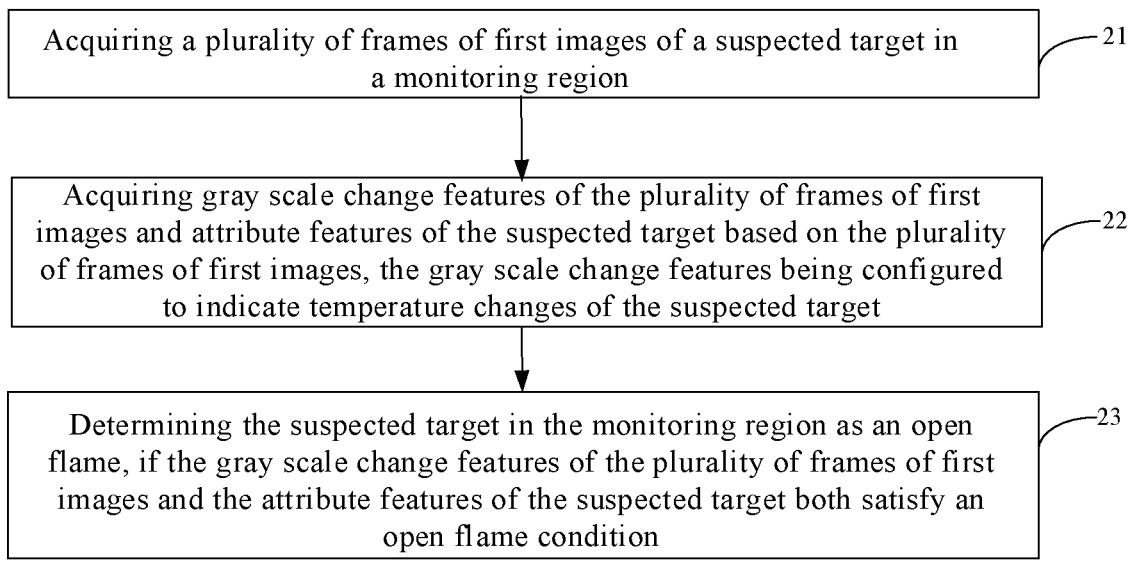
FIG. 2 is a flowchart of a method for detecting an open flame according to an embodiment of the present disclosure.

FIG. 2 is a flowchart of a method for detecting an open flame according to an embodiment as an example. This method is applied to an electronic device, such as the terminal 11 shown in FIG. 1. Referring to FIG. 2, the method includes the following steps.

In step 21, a plurality of frames of first images of a suspected target in a monitoring region is acquired.

Optionally, the step 21 includes, but is not limited to the following sub-steps.

In sub-step 211, a plurality of frames of second images in the monitoring region is acquired, wherein a region displayed by the second images includes a region displayed by the first images.

In the embodiment of the present disclosure, this method being applied to the terminal shown in FIG. 1 is taken as an example. The terminal may acquire the plurality of frames of second images in the monitoring region through a photographing apparatus. If there is a suspected target that may be an open flame in the monitoring region, the suspected target can be displayed in the second images. Taking the images including the suspected target being the first images as an example, since the suspected target is located in the monitoring region, a region occupied by the suspected target is smaller than that of the monitoring region, and the region displayed by the second images in the monitoring region includes the region displayed by the first images. That is, the region displayed by the first images is smaller than the region displayed by the second images. Then, the second images in the monitoring region may be acquired before the first images of the suspected target in the monitoring region are acquired.

For example, the terminal may directly acquire a plurality of frames of second images in the monitoring region. For example, the terminal may directly acquire a plurality of frames of second images in the monitoring region through the photographing apparatus. For example, the terminal may also detect a temperature in the monitoring region through a temperature detecting apparatus prior to acquiring the plurality of frames of second images in the monitoring region. If there is a region in which a temperature is higher than a temperature threshold in the monitoring region, the terminal acquires the plurality of frames of second images in the monitoring region. If the temperature in the monitoring region is lower than the temperature threshold, the terminal does not acquire the plurality of frames of second images in the monitoring region.

It should be noted that in this method, the plurality of frames of second images form continuous images, that is, a video. Data corresponding to the plurality of frames of second images acquired by the terminal may be referred to as raw data. When the terminal processes the plurality of frames of second images, it essentially processes the raw data.

When the photographing apparatus is the infrared camera, the raw data acquired by the terminal is raw data for thermal imaging. The terminal may convert the raw data for thermal imaging into 8-bit image data and full-screen temperature measuring data. The terminal may acquire pixels of an image based on the 8-bit image data, and acquire gray scales or temperatures corresponding to different areas in the image based on the full-screen temperature measuring data.

The temperature detecting apparatus may be in signal connection to the terminal or directly fixed on the terminal. The temperature detecting apparatus may be a multi-light radiation thermometer, a digital thermometer, or the like.

In step 212, images of a suspected region are acquired by extracting a region having a gray scale value greater than a gray scale threshold from each frame of second image, wherein the suspected target is located in the suspected region.

A temperature of an open flame is different from that of its surrounding region, and a gray scale corresponding to an open flame image is different from that of its surrounding region, and a change in gray scale can indicate a change in temperature. For example, when the second images include a region having a gray scale value greater than the gray scale threshold, this region having the gray scale value greater than the gray scale threshold may be regarded as a suspected region, i.e., a region where an open flame may occur. In this case, the terminal may segment the images of the suspected region from the second images by means of a gray scale threshold segmenting method or a temperature threshold segmenting method.

Taking smoking as an example, a lit cigarette butt has a higher temperature than its surrounding region. Images of a suspected region having a temperature greater than 100° C.

are acquired by extracting the suspected region from each frame of second image, and the lit cigarette butt is located in this suspected region.

In step 213, the plurality of frames of first images are acquired by extracting the images of the suspected target from the plurality of frames of images of the suspected region.

Optionally, with respect to the case where a plurality of suspected targets are located in the images of the suspected region, the step 213 includes, but is not limited to the following sub-steps.

In sub-step 2131, distances between each suspected target and other suspected targets in the images of the suspected region is respectively acquired.

For example, that the data corresponding to the plurality of frames of second images acquired by the terminal is regarded as raw data for thermal imaging, the terminal converts the raw data for thermal imaging into 8-bit image data and the terminal may acquire pixels of an image based on the 8-bit image data is still taken as examples, after acquiring the plurality of frames of first images, the terminal acquires pixels of each suspected target by processing the 8-bit image data of each frame of image of the suspected region. Each pixel has corresponding coordinates, and the terminal may determine a distance between each suspected target and other suspected targets based on the coordinates of the pixel.

Since there may be a plurality of pixels for each suspected target, the terminal may determine a position of the suspected target by selecting a middle pixel or a boundary pixel, which is not limited in the embodiment of the present disclosure. The position of each suspected target may be determined in the same way.

In sub-step 2132, distance ranges between each open flame and other open flames in the open flame image are acquired.

The open flame image may be a reference image configured to provide a distance range between the open flames. The distance range may be directly stored in the terminal, or the terminal may also collect and acquire this distance range from other devices.

In sub-step 2133, the plurality of frames of first images may be acquired by segmenting a region of the suspected target from each frame of image of the suspected region, if each distance between the suspected target and other suspected target in the image of the suspected region is within the distance range.

For example, if a distance between the suspected target and other suspected target is detected as 3 meters, and the distance between a lit cigarette butt and other lit cigarette butt ranges from 0.2 meter to 50 meters, it is necessary to segment this suspected target from the images of the suspected region to acquire the first images.

The region of the suspected target may be segmented from the images of the suspected region by a masking method, so as to acquire the plurality of frames of first images.

A suspected target to be determined is screened by means of the above method, such that the suspected target can be accurately determined, which is beneficial to improve an accuracy of the method for detecting the open flame.

Optionally, the step 213 further includes the following sub-steps.

In sub-step 2134, at least one of a position of the suspected target and a number of pixels of the suspected target in each image of the suspected region is acquired; a pixel number range of the open flame and a position range of the open flame in the open flame image are acquired; and the plurality of frames of first images are acquired by segmenting a region of the suspected target from each frame of image of the suspected region, if the suspected target in the image of the suspected region satisfies at least one of the followings: the position of the suspected target is within the above-mentioned position range and the number of pixels of the suspected target is within the above-mentioned pixel number range.

In addition, the sub-step 2134 may also be combined with the sub-step 2131 to the sub-step 2133. If any one of the above three features of the image of the suspected region correspondingly satisfies any one of the above three features of the open flame image, the region of the suspected target is segmented from each frame of image of the suspected region, so as to acquire the plurality of frames of first images.

In step 22, gray scale change features of the plurality of frames of first images and attribute features of the suspected target are acquired based on the plurality of frames of first images, the gray scale change features being configured to indicate temperature changes of the suspected target.

The gray scale change features of the plurality of frames of the first image include at least one of change features of gray scales of the plurality of frames of first images in a time domain and change features of gray scales of the plurality of frames of first images in a frequency domain. The attribute features of the suspected target include at least one of the followings: an area of the suspected target, a shape of the suspected target, a time that the suspected target stays at the same position, and whether the suspected target is dynamic.

Optionally, when the gray scale change features of the plurality of frames of first images include change features of the gray scales of the plurality of frames of first images in the time domain. In step 22, said acquiring the gray scale change features of the plurality of frames of first images based on the plurality of frames of first images includes, but is not limited to the following sub-steps.

In sub-step 221, a gray scale and time of each frame of first image are acquired.

The terminal acquires the gray scale of each frame of first image by processing the raw data corresponding to each frame of first image. The terminal may acquire the time corresponding to each frame of first image by timing, when acquiring each frame of first image. Taking the terminal acquiring the first images through the photographing apparatus as an example, the terminal times when acquiring each frame of first image. This timing may refer to timing a time at which the photographing apparatus acquires a first image. For example, if the photographing apparatus captures the first image at 10:10:00, the time corresponding to the first image is 10:10:00.

It may be understood that the plurality of frames of first images form a video of the suspected target. If an interval time between each frame of first image is t and the time of the first frame of first image is recorded as 0, the time corresponding to the plurality of frames of first images may be 0, t, 2t, and so on.

In sub-step 222, change features of gray scales of the plurality of frames of first images in the time domain are acquired based on the gray scale and time of each frame of first image.

The change features of the gray scales of the plurality of frames of first images in the time domain may be a change curve of the gray scales in the time domain. For example, a graph is drawn by taking the time corresponding to each frame of first image as an abscissa and the gray scale of each frame of first image as an ordinate, thereby acquiring a change curve of the gray scale in the time domain.

Optionally, the gray scale change features of the plurality of frames of first images include change features of gray scales of the plurality of frames of first images in a frequency domain. In step 22, said acquiring the gray scale change features of the plurality of frames of first images based on the plurality of frames of first images includes, but is not limited to the following sub-steps.

In sub-step 22a, a gray scale of each frame of first image is acquired.

In sub-step 22b, change features of the plurality of frames of first images in the frequency domain are acquired by transforming the gray scale of each frame of first image to the frequency domain by means of a Fourier transform formula.

It should be noted that the sub-step 22b includes: at least two frames of first images having the same gray scale based on the gray scale of each frame of first image are respectively acquired, the at least two frames of first images are sorted into a chronological order and then the gray scale of each frame of first image is transformed to the frequency domain by means of the Fourier transform formula.

The change features of the gray scales of the plurality of frames of first images in the frequency domain may be a change curve of the gray scales in the frequency domain. For example, the change features of the gray scales of the first images in the frequency domain are established by taking frequencies that gray scale values of the first images appear as an abscissa, and amplitude values of the gray scales of the first images in the frequency domain as an ordinate. Alternatively, the change features of the gray scales of the first images in the frequency domain are established by taking the gray scale values of the first images as an abscissa, and a number of the gray scales of the first images whose amplitude values in the frequency domain are greater than a reference threshold as an ordinate.

Optionally, the attribute features of the suspected target include the time that the suspected target stays at the same position. In the step 22, said acquiring the attribute features of the suspected target based on the plurality of frames of first images includes, but is not limited to the following sub-steps.

In step 22A, a position of the suspected target in each frame of first image is determined.

The terminal acquires pixels of each frame of first image and acquire the position of the suspected target in each frame of first image based on coordinates of each pixel.

Each frame of first image may include a plurality of pixels. In a case that the position of the suspected target in the first images is determined, a position of a middle pixel or a boundary pixel of each first image may be determined as the position of the suspected target in the first image.

In sub-step 22B, at least two frames of first images in which the suspected target has a same position, and an interval time between two adjacent frames of first images are acquired.

In sub-step 22C, a time that the suspected target stays at the same position is acquired by accumulating the interval time between two adjacent frames of first image among the at least two frames of first images.

For example, if an interval time between two adjacent frames of first images is t, and a number of frames of first images at the same position is 6, the interval time between these 6 frames of first images is 5t.

Optionally, the attribute features of the suspected target include determining whether the suspected target is dynamic. In step 22, said acquiring the attribute features of the suspected target includes, but is not limited to the following sub-steps.

In sub-step I, pixels of each frame of first image are acquired.

In sub-step II, a position of the suspected target in each frame of first image is determined based on the pixels of each frame of first image.

In sub-step III, the suspected target is determined to be dynamic if the positions of the suspected target in at least two frames of first images are different.

After the position of the suspected target in each frame of first image is determined, if the positions of the suspected target in at least two frames of first images are different, it means that the suspected target has moved, and thus the suspected target may be determined to be dynamic. If the position of the suspected target in each frame of first image is the same, it means that the suspected target does not move.

Optionally, the attribute features of the suspected target include the area of the suspected target. In step 22, said acquiring the attribute features of the suspected target based on the plurality of frames of first images includes, but is not limited to the following sub-steps.

In sub-step A1, a number of pixels in any frame of first image and a dimension corresponding to the pixels are acquired.

For example, the terminal may acquire the pixels of each frame of first image and the dimension corresponding to the pixels based on the 8-bit image data of each frame of first image.

In sub-step A2, an area of the suspected target is determined based on the number of pixels in any frame of first image and the dimension corresponding to the pixels.

For example, said determining the area of the suspected target based on the number of pixels in any frame of first image and the dimension corresponding to the pixels includes: for any frame of first image, a product of the number of pixels and the dimension corresponding to the pixels is taken as the area of the suspected target.

Optionally, the attribute features of the suspected target include the shape of the suspected target. In step 22, said acquiring the attribute features of the suspected target based on the plurality of frames of first images includes, but is not limited to the following sub-steps.

In sub-step B1, boundary pixels in any frame of first image are acquired.

In sub-step B2, a shape of the suspected target is determined based on the boundary pixels in any frame of first image.

A boundary position in any frame of first image is determined based on the boundary pixels in any frame of first image, thereby determining the shape of the suspected target.

In step 23, the suspected target in the monitoring region is determined as an open flame if the gray scale change features of the plurality of frames of first images and the attribute features of the suspected target both satisfy an open flame condition.

The suspected target in the monitoring region is determined as an open flame if the features of a first reference number in the gray scale change features of the first images and the features of a second reference number in the attribute features of the suspected target both satisfy the open flame condition.

For example, a ratio of a first reference number to the total number of gray scale change features of the first images reaches a first threshold; and a ratio of a second reference number to the total number of attribute features of the suspected target reaches a second threshold. For example, if the first threshold is 90% and the second threshold is 85%, the first reference number is 90% of the total number of gray scale change features of the first images, and the second reference number is 85% of the total number of attribute features of the suspected target. For another example, the first threshold and the second threshold may both be 100%, and then the first reference number is equal to the total number of gray scale change features of the first images, and the second reference number is equal to the total number of attribute features of the suspected target. That is, the suspected target in the monitoring region is determined as an open flame if all of the gray scale change features of the first images and all of the attribute features of the suspected target satisfy the open flame condition.

The first threshold and the second threshold may be the same or different, the amplitudes of which are not limited in the embodiments of the present disclosure. For example, the amplitudes of the first threshold and the second threshold may be set based on experiences or application scenarios.

Optionally, the open flame condition includes, but is not limited to a gray scale change curve of an open flame image and a physical attribute range of the open flame. The step 23 includes:
  the suspected target in the monitoring region is determined as the open flame, if the gray scale change features of the plurality of frames of first images accord with the gray scale change curve of the open flame image and the attribute features of the suspected target are within the physical attribute range.

Optionally, the gray scale change curve of the open flame image includes at least one of a time-domain change curve and a frequency-domain change curve. The gray scale change features of the plurality of frames of first images include at least one of change features of gray scales of the plurality of frames of first images in a time domain and change features of gray scales of the plurality of frames of first images in a frequency domain. that the suspected target in the monitoring region is determined as the open flame includes:
  the suspected target in the monitoring region is determined as the open flame, if the change features of the gray scales of the plurality of frames of first images in the time domain satisfy the time-domain change curve and the attribute feature of the suspected target are within the physical attribute range, in a case that the gray scale change features of the plurality of frames of first images include the change features of the gray scales of the plurality of frames of first images in the time domain; and
  the suspected target in the monitoring region is determined as the open flame, if the change features of the gray scales of the plurality of frames of first images in the frequency domain satisfy the frequency-domain change curve and the attribute features of the suspected target are within the physical attribute range, in a case that the gray scale change features of the plurality of frames of first images include the change features of the gray scales of the plurality of frames of first images in the frequency domain; and
  the suspected target in the monitoring region is determined as the open flame, if the change features of the gray scales of the plurality of frames of first images in the frequency domain satisfy the frequency-domain change curve and the change features of the gray scales of the plurality of frames of first images in the time domain satisfy the time-domain change curve, and the attribute feature of the suspected target are within the physical attribute range, in a case that the gray scale change features of the plurality of frames of first images include the change features of the gray scales of the plurality of frames of first images in the frequency domain and the change features of the gray scales of the plurality of frames of first images in the time domain.

It should be noted that the time-domain change curve refers to a change curve of the gray scale of the open flame image in the time domain, that is, a change curve of the gray scale of the open flame image over time. That the change features of the gray scales of the plurality of frames of first images in the time domain satisfy the time-domain change curve means that the trend of the time-domain change curve of the gray scales of the plurality of the first images is basically the same as that of the time-domain change curve of the gray scale of the open flame image.

The frequency-domain change curve refers to a change curve of the gray scale of the open flame image in the frequency domain, that is, a change curve between the frequency of the gray scale of the open flame image and an amplitude value of the gray scale in the frequency domain. That the change features of the gray scales of the plurality of frames of first images in the frequency domain satisfy the frequency-domain change curve means that the trend of the frequency-domain change curve of the gray scales of the plurality of first images is basically the same as that of the frequency-domain change curve of the gray scale of the open flame image.

The trend of the time-domain change curve of the gray scales of the plurality of frames of first images being basically the same as that of the time-domain change curve of the gray scale of the open flame image includes, but is not limited to: the similarity between the time-domain change curve of the gray scales of the plurality of frames of first images and the time-domain change curve of the gray scale of the open flame image reaches a certain threshold. The trend of the frequency-domain change curve of the gray scales of the plurality of frames of first images being basically the same as that of the frequency-domain change curve of the gray scale of the open flame image includes, but is not limited to: the similarity between the frequency-domain change curve of the gray scales of the plurality of frames of first images and the frequency-domain change curve of the gray scale of the open flame image reaches a certain threshold.

Optionally, the attribute features of the suspected target include at least one of the followings: an area of the suspected target, a shape of the suspected target, a time that the suspected target stays at the same position, and whether the suspected target is dynamic. That the suspected target in the monitoring region is determined as the open flame includes:
  the suspected target in the monitoring region is determined as the open flame, if the attribute features of the suspected target are within a corresponding physical attribute range.

The physical property range includes an area range of the open flame, a shape of the open flame, a duration that the open flame stays at the same position, and the open flame is dynamic.

That is, the suspected target in the monitoring region is determined as the open flame, if at least one of the following is met: the area of the suspected target is within an area range of the open flame, the shape of the suspected target matches the shape of the open flame, the time that the suspected target stays at the same position is within a duration that the open flame stays at the same position, and the suspected target is dynamic.

Therefore, the open flame is detected through the above steps 21 to 23.

Optionally, the method for detecting the open flame according to the embodiment of the present disclosure further includes:

no open flame is determined in the monitoring region, if any one of the gray scale change features of the plurality of frames of first images and the attribute features of the suspected target does not satisfy the open flame condition.

It may be understood that the suspected target in the monitoring region is not determined as the open flame, if any one of all sub-features of the gray scale change features of the plurality of frames of first images and all of the attribute features of the suspected target does not satisfy the open flame condition.

Optionally, the method for detecting the open flame according to the embodiment of the present disclosure further includes:

alarm information is sent out after an open flame is determined in the monitoring region in in step 23.

After determining that there is an open flame in the monitoring region, the terminal sends out the alarm information, which is conducive to prevent the open flame in time and avoid affecting the human health and causing safety hazards.

The terminal may send out the alarm information only once, or send out a plurality of pieces of alarm information at intervals of a second reference time. The second reference time may be 3 seconds, 5 seconds, 10 seconds, 15 seconds, 20 seconds, 30 seconds, 35 seconds, 40 seconds, or the like.

The alarm information may be audio information, warning light flashing, or image display information.

According to the method for detecting the open flame provided by the embodiment of the present disclosure, the plurality of frames of first images of the suspected target in the monitoring region, that is, a video of the suspected target, are acquired. It is conducive to accurately acquire the gray scale change features of the plurality of frames of first images and the attribute features of the suspected target. The temperature change features of the suspected target can be accurately determined based on the gray scale change features of the first images. Two aspects (the temperature change features of the suspected target and the attribute features of the suspected target) are combined so as to determine whether the open flame condition is satisfied. Therefore, this method can accurately detect whether there is an open flame in the monitoring region.

Figure 3:
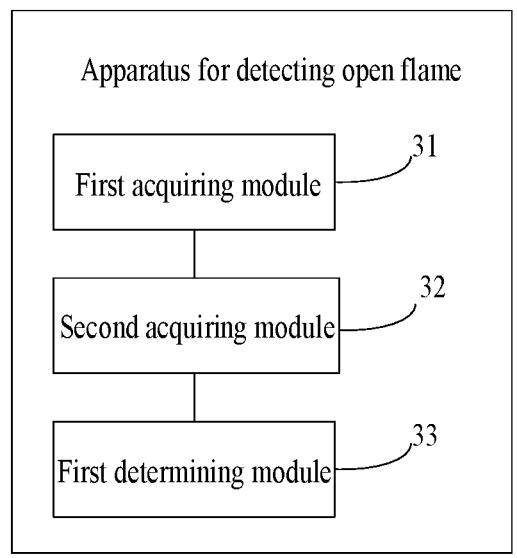
FIG. 3 is a schematic structural diagram of an apparatus for detecting an open flame according to an embodiment of the present disclosure.

Based on the same concept as the above method, as shown in FIG. 3, an embodiment of the present disclosure provides an apparatus for detecting an open flame. The apparatus includes:

a first acquiring module 31, configured to acquire a plurality of frames of first images of a suspected target in a monitoring region;

a second acquiring module 32, configured to acquire gray scale change features of the plurality of frames of first images and attribute features of the suspected target based on the plurality of frames of first images, the gray scale change features being configured to indicate temperature changes of the suspected target; and a first determining module 33, configured to determine the suspected target in the monitoring region as an open flame if the gray scale change features of the plurality of frames of first images and the attribute features of the suspected target both satisfy an open flame condition.

Optionally, the open flame condition includes a gray scale change curve of an open flame image and a physical attribute range of the open flame. The first determining module 33 is configured to:

determine the suspected target in the monitoring region as the open flame, if the gray scale change features of the plurality of frames of first images accord with the gray scale change curve of the open flame image and the attribute features of the suspected target are within the physical attribute range.

Optionally, the gray scale change curve of the open flame image includes at least one of a time-domain change curve and a frequency-domain change curve. The gray scale change features of the plurality of frames of first image include at least one of change features of gray scales of the plurality of frames of first images in a time domain and change features of gray scales of the plurality of frames of first images in a frequency domain. That the suspected target in the monitoring region is determined as the open flame includes:

the suspected target in the monitoring region is determined as the open flame, if the change features of the gray scales of the plurality of frames of first images in the time domain satisfy the time-domain change curve and the attribute feature of the suspected target are within the physical attribute range, in a case that the gray scale change features of the plurality of frames of first images include the change features of the gray scales of the plurality of frames of first images in the time domain; and the suspected target in the monitoring region is the open flame, if the change features of the gray scales of the plurality of frames of first images in the frequency domain satisfy the frequency-domain change curve and the attribute features of the suspected target are within the physical attribute range, in a case that the gray scale change features of the plurality of frames of first images include the change features of the gray scales of the plurality of frames of first images in the frequency domain; and the suspected target in the monitoring region is determined as the open flame, if the change features of the gray scales of the plurality of frames of first images in the frequency domain satisfy the frequency-domain change curve and the change features of the gray scales of the plurality of frames of first images in the time domain satisfy the time-domain change curve, and the attribute features of the suspected target are within the physical attribute range, in a case that the gray scale change features of the plurality of frames of first images include the change features of the gray scales of the plurality of frames of first images in the frequency domain and the change features of the gray scales of the plurality of frames of first images in the time domain.

Optionally, the attribute features of the suspected target include at least one of the followings: an area of the suspected target, a shape of the suspected target, a time that the suspected target stays at the same position, and whether the suspected target is dynamic. That the suspected target in the monitoring region is determined as the open flame includes:

the suspected target in the monitoring region is determined as the open flame, if the attribute features of the suspected target is within the corresponding physical attribute range.

The physical property range includes an area range of the open flame, a shape of the open flame, a duration that the open flame stays at the same position, and the open flame is dynamic.

Figure 4:
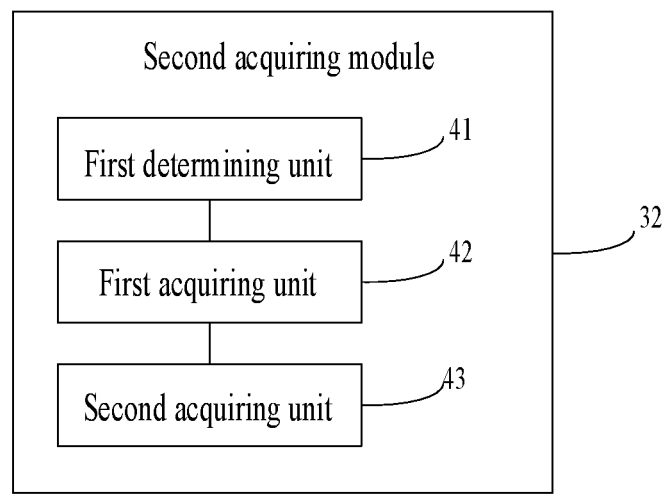
FIG. 4 is a schematic structural diagram of a second acquiring module according to an embodiment of the present disclosure.

Optionally, the attribute features of the suspected target include the time that the suspected target stays at the same position. As shown in FIG. 4, the second acquiring module 32 includes:

a first determining unit 41, configured to determine a position of the suspected target in each frame of first image;

a first acquiring unit 42, configured to acquire at least two frames of first images in which the suspected target has a same position, and an interval time between two adjacent frames of first images; and a second acquiring unit 43, configured to acquire a time that the suspected target stays at the same position by accumulating the interval time between two adjacent frames of first images among the at least two frames of first images.

Figure 5:
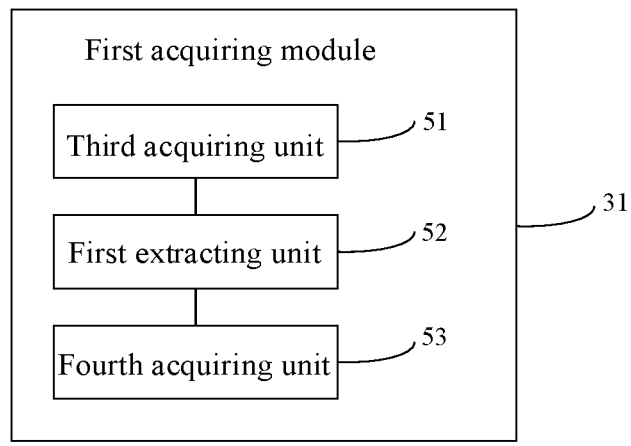
FIG. 5 is a schematic structural diagram of a first acquiring module according to an embodiment of the present disclosure.

Optionally, as shown in FIG. 5, the first acquiring module 31 includes:

a third acquiring unit 51, configured to acquire a plurality of frames of second images in the monitoring region, wherein a region displayed by the second images includes a region displayed by the first images;

a first extracting unit 52, configured to acquire images of a suspected region by extracting a region having a gray scale value greater than a gray scale threshold from the second images, wherein the suspected target is located in the suspected region; and a fourth acquiring unit 53, configured to acquire the plurality of frames of first images by extracting the images of the suspected target from the plurality of frames of images of the suspected region.

Figure 6:
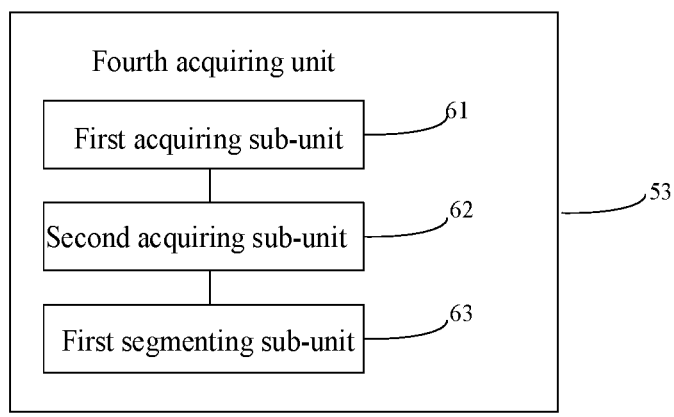
FIG. 6 is a schematic structural diagram of a fourth acquiring unit according to an embodiment of the present disclosure.

Optionally, a plurality of suspected targets are located in the images of the suspected region. As shown in FIG. 6, the fourth acquiring unit 53 includes:

a first acquiring sub-unit 61, configured to respectively acquire distances between each suspected target and other suspected targets in each image of the suspected region;

a second acquiring sub-unit 62, configured to acquire distance ranges between each open flame and other open flames in the open flame image; and a first segmenting sub-unit 63, configured to acquire the plurality of frames of first images by segmenting a region of the suspected target from each frame of image of the suspected region, if the distances between each suspected target and other suspected targets in the image of the suspected region are within the distance ranges.

Figure 7:
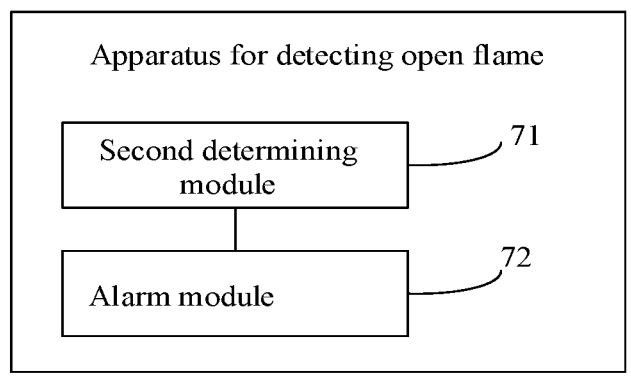
FIG. 7 is a schematic structural diagram of an apparatus for detecting an open flame according to an embodiment of the present disclosure.

Optionally, as shown in FIG. 7, the apparatus according to the embodiment of the present disclosure further includes:

a second determining module 71, configured to determine that there is no open flame in the monitoring region, if any one of the gray scale change features of the plurality of frames of first images and the attribute features of the suspected target does not satisfy the open flame condition.

Optionally, as shown in FIG. 7, the apparatus according to the embodiment of the present disclosure further includes:

an alarm module 72, configured to send out alarm information after the first determining module determines that there is an open flame in the monitoring region.

According to the apparatus for detecting the open flame provided by the embodiment of the present disclosure, the plurality of frames of first images of the suspected target in the monitoring region, that is, a video of the suspected target, is acquired by the first acquiring module 31, which is conducive to accurately acquire the gray scale change features of the plurality of frames of first frames and the attribute features of the suspected target. The temperature change features of the suspected target can be accurately determined based on the gray scale change features of the first images. Two aspects (the temperature change features of the suspected target and the attribute features of the suspected target) are combined so as to determine whether the open flame condition is satisfied. Therefore, this apparatus can accurately detect whether there is an open flame in the monitoring region.

It should be noted: when the apparatus according to the embodiment implements its functions, only the partitioning of the above functional modules is used as an example. In practical applications, the foregoing functions can be allocated to be completed by different functional modules as required. That is, an internal structure of a device is partitioned into different functional modules to complete all or part of the functions described above. In addition, the apparatus according to the foregoing embodiment and the method embodiment belong to the same concept, and the specific implementation process is detailed in the method embodiments, which will not be repeated here.

Figure 8:
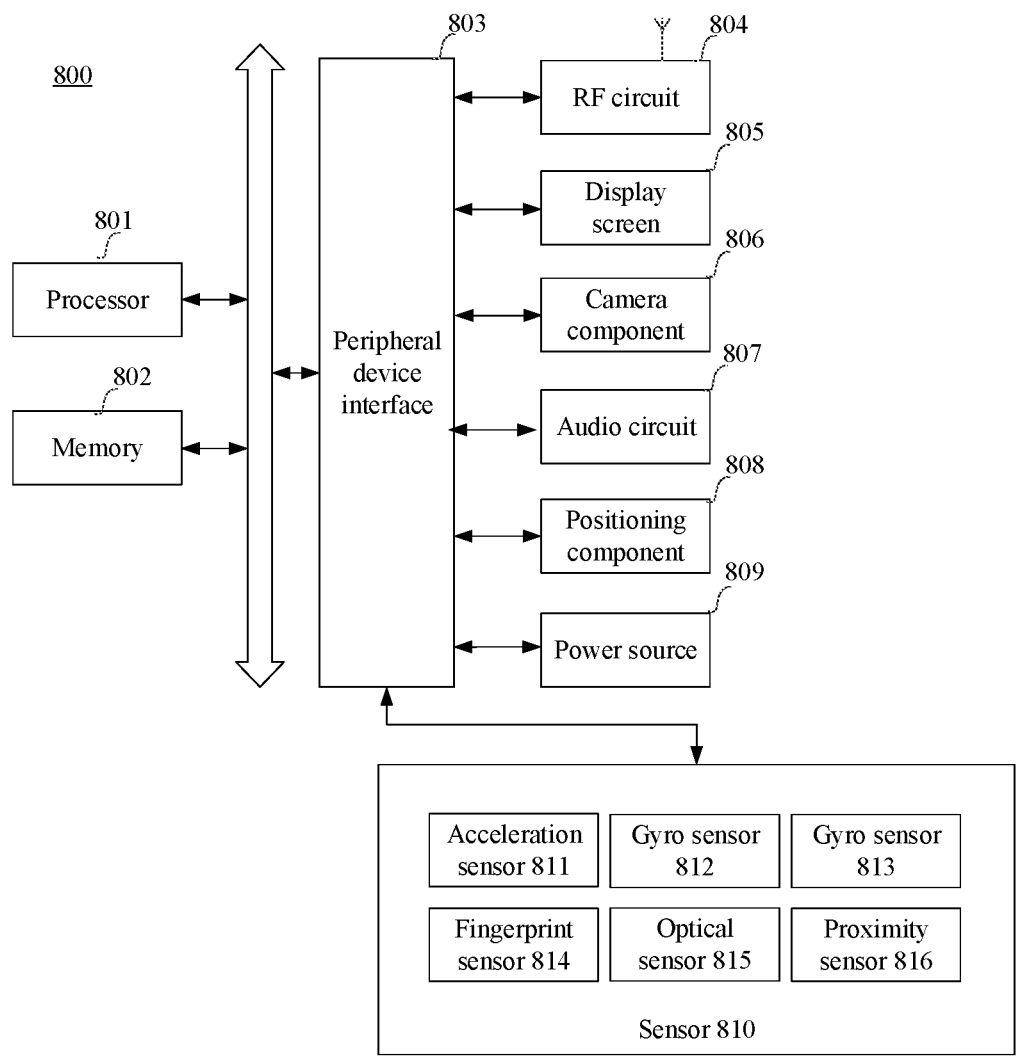
FIG. 8 is a schematic structural diagram of a terminal according to an embodiment of the present disclosure.

FIG. 8 is a schematic structural diagram of a terminal 800 for a method for detecting an open flame according to an embodiment of the present disclosure. The terminal 800 may be a portable mobile terminal, such as a smart phone, a tablet computer, a moving picture experts group audio layer III (MP3) player, a moving picture experts group audio layer IV (MP4) player, a laptop or a desk computer. The terminal 800 may also be called a UE (User Equipment), a portable terminal, a laptop terminal, a desk terminal, etc.

Generally, the terminal 800 includes a processor 801 and a memory 802.

The processor 801 may include one or more processing cores, such as a 4-core processor and a 7-core processor. The processor 801 may be implemented by at least one hardware of a digital signal processing (DSP), a field-programmable gate array (FPGA), and a programmable logic array (PLA). The processor 801 may also include a main processor and a coprocessor. The main processor is a processor configured to process data in an awake state, and is also called a central processing unit (CPU). The coprocessor is a low-power-consumption processor configured to process the data in a standby state. In some embodiments, the processor 801 may be integrated with a graphics processing unit (GPU), which is configured to render and draw the content that needs to be displayed by a display screen. In some embodiments, the processor 801 may also include an artificial intelligence (AI) processor configured to process computational operations related to machine learning.

The memory 802 may include one or more computer-readable storage mediums, which can be non-transitory. The memory 802 may also include a high-speed random access memory, as well as a non-volatile memory, such as one or more disk storage devices and flash storage devices. In some embodiments, the non-transitory computer-readable storage medium in the memory 802 is configured to store at least one instruction, the instruction being executed by the processor 801 to implement the method for detecting the open flame according to the method embodiment of the present disclosure.

In some embodiments, the terminal 800 also optionally includes a peripheral device interface 803 and at least one peripheral device. The processor 801, the memory 802, and the peripheral device interface 803 may be connected by a bus or a signal line. Each peripheral device may be connected to the peripheral device interface 803 by a bus, a signal line or a circuit board. Specifically, the peripheral device includes at least one of a radio frequency circuit 804, a display screen 805, a camera 806, an audio circuit 807, a positioning component 808 and a power source 809.

The peripheral device interface 803 may be configured to connect at least one peripheral device associated with an input/output (I/O) to the processor 801 and the memory 802. In some embodiments, the processor 801, the memory 802 and the peripheral device interface 803 are integrated on the same chip or circuit board. In some other embodiments, any one or two of the processor 801, the memory 802 and the peripheral device interface 803 may be implemented on a separate chip or circuit board, which is not limited in the present embodiment.

The radio frequency circuit 804 is configured to receive and transmit a radio frequency (RF) signal, which is also referred to as an electromagnetic signal. The RF circuit 804 communicates with a communication network and other communication devices via the electromagnetic signal. The radio frequency circuit 804 converts the electrical signal into the electromagnetic signal for transmission, or converts the received electromagnetic signal into the electrical signal. Optionally, the RF circuit 804 includes an antenna system, an RF transceiver, one or more amplifiers, a tuner, an oscillator, a digital signal processor, a codec chipset, a subscriber identity module card, and the like. The RF circuit 804 can communicate with other terminals via at least one wireless communication protocol. The wireless communication protocol includes, but not limited to, a metropolitan area network, various generations of mobile communication networks (2G, 3G, 4G, and 5G), a wireless local area network, and a wireless fidelity (WiFi) network. In some embodiments, the RF circuit 804 may also include near field communication (NFC) related circuits, which is not limited in the present disclosure.

The display screen 805 is configured to display a user interface (UI). The UI may include graphics, text, icons, videos, and any combination thereof. When the display screen 805 is a touch display screen, the display screen 805 also has the capacity to acquire touch signals on or over the surface of the display screen 805. The touch signal may be input into the processor 801 as a control signal for processing. At this time, the display screen 805 may also be configured to provide virtual buttons and/or virtual keyboards, which are also referred to as soft buttons and/or soft keyboards. In some embodiments, one display screen 805 may be disposed on the front panel of the terminal 800. In some other embodiments, at least two display screens 805 may be disposed respectively on different surfaces of the terminal 800 or in a folded design. In further embodiments, the display screen 805 may be a flexible display screen disposed on the curved or folded surface of the terminal 800. Even the display screen 805 may have an irregular shape other than a rectangle. That is, the display screen 805 may be an irregular-shaped screen. The display screen 805 may be prepared from a material such as a liquid crystal display (LCD), an organic light-emitting diode (OLED), etc.

The camera component 806 is configured to capture images or videos. Optionally, the camera component 806 includes a front camera and a rear camera. Usually, the front camera is placed on the front panel of the terminal, and the rear camera is placed on the back of the terminal. In some embodiments, at least two rear cameras are disposed, and are at least one of a main camera, a depth-of-field camera, a wide-angle camera, and a telephoto camera respectively, so as to realize a background blurring function achieved by fusion of the main camera and the depth-of-field camera, panoramic shooting and virtual reality (VR) shooting functions achieved by fusion of the main camera and the wide-angle camera or other fusion shooting functions. In some embodiments, the camera component 806 may also include a flashlight. The flashlight may be a mono-color temperature flashlight or a two-color temperature flashlight. The two-color temperature flash is a combination of a warm flashlight and a cold flashlight and can be used for light compensation at different color temperatures.

The audio circuit 807 may include a microphone and a speaker. The microphone is configured to collect sound waves of users and environments, and convert the sound waves into electrical signals which are input into the processor 801 for processing, or input into the RF circuit 804 for voice communication. For the purpose of stereo acquisition or noise reduction, there may be a plurality of microphones respectively disposed at different locations of the terminal 800. The microphone may also be an array microphone or an omnidirectional acquisition microphone. The speaker is then configured to convert the electrical signals from the processor 801 or the RF circuit 804 into the sound waves. The speaker may be a conventional film speaker or a piezoelectric ceramic speaker. When the speaker is the piezoelectric ceramic speaker, the electrical signal can be converted into not only human-audible sound waves but also the sound waves which are inaudible to humans for the purpose of ranging and the like. In some embodiments, the audio circuit 807 may also include a headphone jack.

The positioning component 808 is configured to locate the current geographic location of the terminal 800 to implement navigation or location-based service (LBS). The positioning component 808 may be a positioning component based on the American global positioning system (GPS), the Chinese Beidou system, the Grenas system in Russia or the European Union's Galileo system.

The power source 809 is configured to power up various components in the terminal 800. The power source 809 may be alternating current, direct current, a disposable battery, or a rechargeable battery. When the power source 809 includes the rechargeable battery, the rechargeable battery may a wired rechargeable battery or a wireless rechargeable battery. The rechargeable battery may also support the fast charging technology.

In some embodiments, the terminal 800 also includes one or more sensors 810. The one or more sensors 810 include, but not limited to, an acceleration sensor 811, a gyro sensor 812, a pressure sensor 813, a fingerprint sensor 814, an optical sensor 815 and a proximity sensor 816.

The acceleration sensor 811 may detect magnitudes of accelerations on three coordinate axes of a coordinate system established by the terminal 800. For example, the acceleration sensor 811 may be configured to detect components of a gravitational acceleration on the three coordinate axes. The processor 801 may control the display screen 805 to display a user interface in a landscape view or a portrait view according to a gravity acceleration signal collected by the acceleration sensor 811. The acceleration sensor 811 may also be configured to collect motion data of a game or a user.

The gyro sensor 812 can detect a body direction and a rotation angle of the terminal 800, and can cooperate with the acceleration sensor 811 to collect a 3D motion of the user on the terminal 800. Based on the data collected by the gyro sensor 812, the processor 801 can serve the following functions: motion sensing (such as changing the UI according to a user's tilt operation), image stabilization during shooting, game control and inertial navigation.

The pressure sensor 813 may be disposed on a side frame of the terminal 800 and/or a lower layer of the display screen 805. When the pressure sensor 813 is disposed on the side frame of the terminal 800, a user's holding signal to the terminal 800 can be detected. The processor 801 can perform left-right hand recognition or quick operation according to the holding signal collected by the pressure sensor 813. When the pressure sensor 813 is disposed on the lower layer of the display screen 805, the processor 801 controls an operable control on the UI according to a user's pressure operation on the display screen 805. The operable control includes at least one of a button control, a scroll bar control, an icon control and a menu control.

The fingerprint sensor 814 is configured to collect a user's fingerprint. The processor 801 identifies the user's identity based on the fingerprint collected by the fingerprint sensor 814, or the fingerprint sensor 814 identifies the user's identity based on the collected fingerprint. When the user's identity is identified as trusted, the processor 801 authorizes the user to perform related sensitive operations, such as unlocking the screen, viewing encrypted information, downloading software, paying, and changing settings. The fingerprint sensor 814 may be provided on the front, back, or side of the terminal 800. When the terminal 800 is provided with a physical button or a manufacturer's Logo, the fingerprint sensor 814 may be integrated with the physical button or the manufacturer's Logo.

The optical sensor 815 is configured to collect ambient light intensity. In one embodiment, the processor 801 may control the display brightness of the display screen 805 according to the ambient light intensity collected by the optical sensor 815. Specifically, when the ambient light intensity is high, the display brightness of the display screen 805 is increased; and when the ambient light intensity is low, the display brightness of the display screen 805 is decreased. In another embodiment, the processor 801 may also dynamically adjust shooting parameters of the camera component 806 based on the ambient light intensity collected by the optical sensor 815.

The proximity sensor 816, also referred to as a distance sensor, is usually disposed on the front panel of the terminal 800. The proximity sensor 816 is configured to capture a distance between the user and a front surface of the terminal 800. In one embodiment, when the proximity sensor 816 detects that the distance between the user and the front surface of the terminal 800 becomes gradually smaller, the processor 801 controls the display screen 805 to switch from a screen-on state to a screen-off state. When it is detected that the distance between the user and the front surface of the terminal 800 gradually increases, the processor 801 controls the display screen 805 to switch from the screen-off state to the screen-on state.

It will be understood by those skilled in the art that the structure shown in FIG. 8 does not constitute a limitation to the terminal 800, and may include more or less components than those illustrated, or combine some components or adopt different component arrangements.

For example, a computer device is further provided. The computer device includes a processor and a memory, wherein the memory is configured to store at least one instruction. The at least one instruction is configured to be performed by one or more processors to implement the above method for detecting the open flame.

For example, a computer-readable storage medium is further provided. The computer-readable storage medium is configured to store at least one instruction therein, which is performed by the processor of the computer device to implement the above method for detecting the open flame.

Optionally, the computer-readable storage medium may be an ROM, a random access memory (RAM), a compact disc read-only memory (CD-ROM), a magnetic tape, a floppy disk, an optical data storage device, etc.

All the above-mentioned optional technical solutions may be combined in any way to form optional embodiments of the present disclosure, which are not be repeated here.

The foregoing descriptions are merely illustrative embodiments of the present disclosure, and are not intended to limit the protection scope of the present disclosure. Within the spirit and principles of the present disclosure, any modifications, equivalent substitutions, improvements, etc., are within the protection scope of the present disclosure.

What is claimed is:

1. A method for detecting an open flame, which is applied to an electronic device to detect the open flame and comprises:
    acquiring a plurality of frames of first images of a suspected target in a monitoring region;
    acquiring gray scale change features of the plurality of frames of first images and attribute features of the suspected target based on the plurality of frames of first images, wherein the gray scale change features are configured to indicate temperature changes of the suspected target, and the attribute features of the suspected target comprise: a time that the suspected target stays at a same position and whether the suspected target is dynamic; and
    determining the suspected target in the monitoring region as the open flame, in response to the gray scale change features of the plurality of frames of first images according with a gray scale change curve of an open flame image and the attribute features of the suspected target being within a physical attribute range, wherein the physical attribute range comprises a duration that the open flame stays at the same position and the open flame is dynamic, and the open flame being dynamic means that positions of the suspected target in at least two frames of the plurality of frames of first images are different; and
    wherein said acquiring the attribute features of the suspected target based on the plurality of frames of first images comprises:
    determining a position of the suspected target in each frame of the plurality of frames of first images;
    acquiring at least two frames of the plurality of frames of first images in which the suspected target has the same position, and an interval time between two adjacent frames of first images among the at least two frames of the plurality of frames of first images in which the suspected target has the same position; and
    acquiring the time that the suspected target stays at the same position by accumulating the interval time.

2. The method according to claim 1, wherein the gray scale change curve of the open flame image comprises at least one of a time-domain change curve or a frequency-domain change curve;
    wherein the gray scale change features of the plurality of frames of first images comprise at least one of change features of gray scales of the plurality of frames of first images in a time domain or change features of gray scales of the plurality of frames of first images in a frequency domain; and wherein said determining the suspected target in the monitoring region as the open flame comprises:

determining the suspected target in the monitoring region as the open flame, in response to the change features of the gray scales of the plurality of frames of first images in the time domain satisfying the time-domain change curve and the attribute features of the suspected target being within the physical attribute range, in a case that the gray scale change features of the plurality of frames of first images comprise the change features of the gray scales of the plurality of frames of first images in the time domain;

determining the suspected target in the monitoring region as the open flame, in response to the change features of the gray scales of the plurality of frames of first images in the frequency domain satisfying the frequency-domain change curve and the attribute features of the suspected target being within the physical attribute range, in a case that the gray scale change features of the plurality of frames of first images comprise the change features of the gray scales of the plurality of frames of first images in the frequency domain; or determining the suspected target in the monitoring region as the open flame, in response to the change features of the gray scales of the plurality of frames of first images in the frequency domain satisfying the frequency-domain change curve and the change features of the gray scales of the plurality of frames of first images in the time domain satisfying the time-domain change curve, and the attribute features of the suspected target being within the physical attribute range, in a case that the gray scale change features of the plurality of frames of first images comprise the change features of the gray scales of the plurality of frames of first images in the frequency domain and the change features of the gray scales of the plurality of frames of first images in the time domain.

3. The method according to claim 1, wherein the attribute features of the suspected target comprise at least one of: an area of the suspected target, and a shape of the suspected target; and wherein the physical attribute range comprises an area range of the open flame, and a shape of the open flame.

4. The method according to claim 2, wherein the attribute features of the suspected target comprise at least one of: an area of the suspected target, and a shape of the suspected target; and wherein the physical attribute range comprises an area range of the open flame, and a shape of the open flame.

5. The method according to claim 1, wherein said acquiring the plurality of frames of first images of the suspected target in the monitoring region comprises:

acquiring a plurality of frames of second images in the monitoring region, wherein a region displayed by the plurality of frames of second images comprises a region displayed by the plurality of frames of first images;

acquiring images of a suspected region by extracting a region having a gray scale value greater than a gray scale threshold from the plurality of frames of second images, wherein the suspected target is located in the suspected region; and acquiring the plurality of frames of first images by extracting images of the suspected target from a plurality of frames of images of the suspected region.

6. The method according to claim 5, wherein, based on a plurality of suspected targets being located in the images of the suspected region, said acquiring the plurality of frames of first images by extracting the images of the suspected target from the plurality of frames of images of the suspected region comprises:

acquiring distances between each suspected target of the plurality of suspected targets and other suspected targets in each image of the images of the suspected region;

acquiring distance ranges between each open flame and other open flames in an open flame image; and acquiring the plurality of frames of first images by segmenting a region of each suspected target of the plurality of suspected targets from each image of the images of the suspected region, in response to the distances between each suspected target of the plurality of suspected targets and other suspected targets in the images of the suspected region being within the distance ranges.

7. An apparatus for detecting an open flame, comprising a processor and a memory, wherein the memory stores at least one instruction therein, the at least one instruction being loaded and performed by the processor to implement the method for detecting the open flame according to claim 1.

8. A non-transitory computer-readable storage medium storing at least one instruction therein, wherein the at least one instruction is loaded and performed by a processor to implement the method for detecting the open flame according to claim 1.

9. An apparatus for detecting an open flame, comprising:

a first acquiring module, configured to acquire a plurality of frames of first images of a suspected target in a monitoring region;

a second acquiring module, configured to acquire gray scale change features of the plurality of frames of first images and attribute features of the suspected target based on the plurality of frames of first images, wherein the gray scale change features are configured to indicate temperature changes of the suspected target, and the attribute features of the suspected target comprise: a time that the suspected target stays at a same position and whether the suspected target is dynamic; and a first determining module, configured to determine the suspected target in the monitoring region as the open flame, if the gray scale change features of the plurality of frames of first images accord with a gray scale change curve of an open flame image and the attribute features of the suspected target are within a physical attribute range, wherein the physical attribute range comprises a duration that the open flame stays at the same position, and the open flame is dynamic, and the open flame being dynamic means that positions of the suspected target in at least two frames of the plurality of frames of first images are different; and wherein the second acquiring module comprises:

a first determining unit, configured to determine a position of the suspected target in each frame of the plurality of frames of first images;

a first acquiring unit, configured to acquire at least two frames of the plurality of frames of first images in which the suspected target has the same position, and an interval time between two adjacent frames of first images among the at least two frames of the plurality of frames of first images in which the suspected target has the same position; and a second acquiring unit, configured to acquire the time that the suspected target stays at the same position by accumulating the interval time.

10. The apparatus according to claim 9, wherein the gray scale change curve of the open flame image comprises at least one of a time-domain change curve or a frequency-domain change curve;

wherein the gray scale change features of the plurality of frames of first image comprise at least one of change features of gray scales of the plurality of frames of first images in a time domain or change features of gray scales of the plurality of frames of first images in a frequency domain; and wherein the first determining module is configured to:

determine the suspected target in the monitoring region as the open flame, in response to determining that the change features of the gray scales of the plurality of frames of first images in the time domain satisfy the time-domain change curve and the attribute features of the suspected target are within the physical attribute range, in a case that the gray scale change features of the plurality of frames of first images comprise the change features of the gray scales of the plurality of frames of first images in the time domain;

determine the suspected target in the monitoring region as the open flame, in response to determining that the change features of the gray scales of the plurality of frames of first images in the frequency domain satisfy the frequency-domain change curve and the attribute features of the suspected target are within the physical attribute range, in a case that the gray scale change features of the plurality of frames of first images comprise the change features of the gray scales of the plurality of frames of first images in the frequency domain; or determine the suspected target in the monitoring region as the open flame, in response to determining that the change features of the gray scales of the plurality of frames of first images in the frequency domain satisfy the frequency-domain change curve and the change features of the gray scales of the plurality of frames of first images in the time domain satisfy the time-domain change curve, and the attribute features of the suspected target are within the physical attribute range, in a case that the gray scale change features of the plurality of frames of first images comprise the change features of the gray scales of the plurality of frames of first images in the frequency domain and the change features of the gray scales of the plurality of frames of first images in the time domain.

11. The apparatus according to claim 10, wherein the attribute features of the suspected target comprise at least one of: an area of the suspected target, and a shape of the suspected target; and wherein the physical attribute range comprises an area range of the open flame, and a shape of the open flame.

12. The apparatus according to claim 9, wherein the attribute features of the suspected target comprise at least one of: an area of the suspected target, and a shape of the suspected target; and wherein the physical attribute range comprises an area range of the open flame, and a shape of the open flame.

13. The apparatus according to claim 9, wherein the first acquiring module comprises:

a third acquiring unit, configured to acquire a plurality of frames of second images in the monitoring region, wherein a region displayed by the plurality of frames of second images includes a region displayed by the plurality of frames of first images;

a first extracting unit, configured to acquire images of a suspected region by extracting a region having a gray scale value greater than a gray scale threshold from the plurality of frames of second images, wherein the suspected target is located in the suspected region; and a fourth acquiring unit, configured to acquire the plurality of frames of first images by extracting images of the suspected target from a plurality of frames of images of the suspected region.

14. The apparatus according to claim 13, wherein a plurality of suspected targets are located in the images of the suspected region; and wherein the fourth acquiring unit comprises:

a first acquiring sub-unit, configured to acquire distances between each suspected target of the plurality of suspected targets and other suspected targets in each image of the images of the suspected region;

a second acquiring sub-unit, configured to acquire distance ranges between each open flame and other open flames in an open flame image; and a first segmenting sub-unit, configured to acquire the plurality of frames of first images by segmenting a region of each suspected target of the plurality of suspected targets from each image of the images of the suspected region, if the distances between each suspected target of the plurality of suspected targets and other suspected targets in the images of the suspected region are within the distance ranges.

* * * * *